United States Patent [19]
Berger et al.

[11] Patent Number: 5,801,332
[45] Date of Patent: Sep. 1, 1998

[54] ELASTICALLY RECOVERABLE SILICONE SPLICE COVER

[75] Inventors: Todd P. Berger, Lago Vista; Frank Yi Xu, Austin, both of Tex.

[73] Assignee: Minnesota Mining and Manufacturing Company, St. Paul, Minn.

[21] Appl. No.: 521,887

[22] Filed: Aug. 31, 1995

[51] Int. Cl.$^6$ ............................................. H02G 15/064
[52] U.S. Cl. ................................. 174/73.1; 174/74 R
[58] Field of Search ............................... 174/74 R, 74 A, 174/73.1, 84 R, 110 S; 524/862

[56] References Cited

U.S. PATENT DOCUMENTS

| | | | |
|---|---|---|---|
| 3,515,798 | 6/1970 | Sievert | 174/135 |
| 3,692,922 | 9/1972 | Sugimoto et al. | 174/73.1 |
| 3,717,717 | 2/1973 | Cunnigham et al. | 174/73 R |
| 4,079,189 | 3/1978 | Troccoli | 174/73.1 |
| 4,162,243 | 7/1979 | Lee et al. | 260/37 SB X |
| 4,377,547 | 3/1983 | Hervig | 264/262 |
| 4,383,131 | 5/1983 | Clabburn | 174/73 R |
| 4,389,440 | 6/1983 | Keith | 428/36 |
| 4,390,745 | 6/1983 | Böttcher et al. | 174/73 R |
| 4,431,861 | 2/1984 | Clabburn et al. | 174/73 R |
| 4,444,944 | 4/1984 | Matsushita | 524/786 |
| 4,503,105 | 3/1985 | Tomioka | 428/36 |
| 4,544,696 | 10/1985 | Streusand et al. | 524/428 |
| 4,588,768 | 5/1986 | Streusand | 524/443 X |
| 4,604,424 | 8/1986 | Cole et al. | 524/862 |
| 4,871,599 | 10/1989 | Knorr | 428/36.9 |
| 4,934,227 | 6/1990 | Knorr | 82/173 |
| 4,941,311 | 7/1990 | Ardueser et al. | 53/587 |
| 5,011,870 | 4/1991 | Peterson | 523/220 |
| 5,171,940 | 12/1992 | Vallauri | 174/73.1 |
| 5,294,752 | 3/1994 | Vallauri et al. | 174/73.1 |
| 5,352,731 | 10/1994 | Nakano et al. | 524/786 |
| 5,365,020 | 11/1994 | Vallauri et al. | 174/73.1 |
| 5,367,282 | 11/1994 | Clem | 338/22 R X |
| 5,502,279 | 3/1996 | Mirebeau et al. | 174/73.1 |

FOREIGN PATENT DOCUMENTS 0 435 569 A1  7/1991  European Pat. Off. ..... H02G 15/184

*Primary Examiner*—Kristine L. Kincaid
*Assistant Examiner*—Chau N. Nguyen
*Attorney, Agent, or Firm*—Darla P. Fonseca

[57] ABSTRACT

An elastically recoverable elastomeric splice cover suitable for use covering a joint connector in a cable conductor having a central body with two distal opposing geometric cones capped by extended endseals, and formed from three contiguous layers, a) a semiconductive outer shield layer, b) an inner toroidal electrode disposed along a central axis having a length less than that of the body, c) and interposed therebetween, an intermediate insulative layer having a length equal to that of the body and geometric cones. The outer shield layer and electrode are formed from a thermally conductive silicone elastomer, and all of the layers are formed from a silicone elastomer having a tear strength of at least about 15 N/mm, and an elongation of at least about 400%. The insulative layer further includes from about 10% to about 35% of an electrically insulative filler, and has a minimum thermal conductivity of at least about 0.18 W/mK, wherein after 30 alternating load current cycles the connector has maintained a temperature of about 10° C. cooler than the cable conductor beyond the splice.

16 Claims, 2 Drawing Sheets

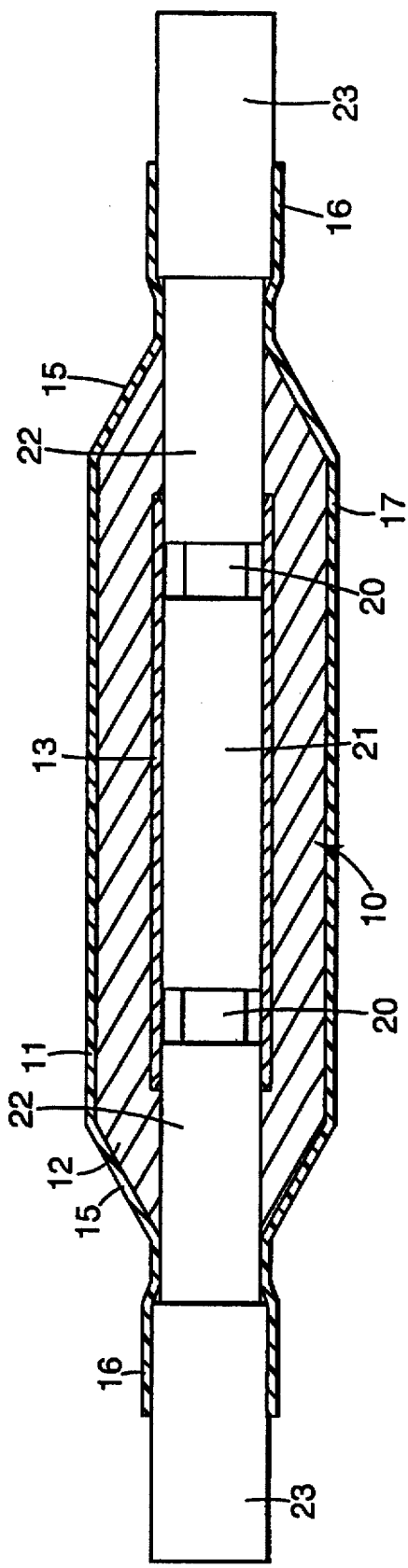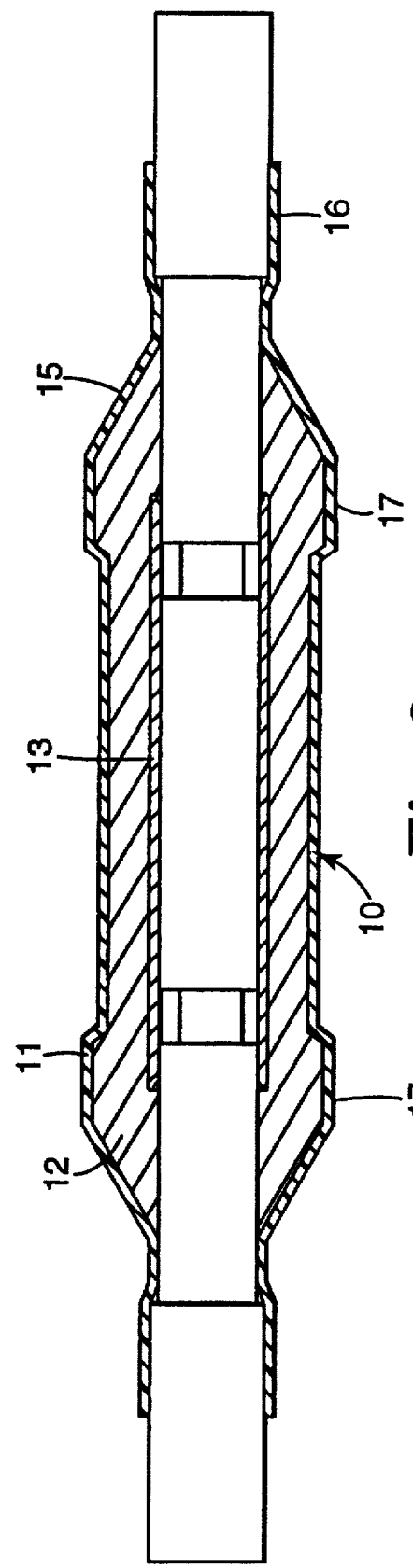

ELASTICALLY RECOVERABLE SILICONE SPLICE COVER

BACKGROUND OF THE INVENTION

1. Field of the Invention

The present invention relates to an elastically recoverable silicone splice for enclosing a connection or termination of an electrical cable, such splice having improved thermal conductivity and tear strength.

2. Description of the Related Art

Elastically recoverable or recoverable silicone splices are known in the art in various designs.

U.S. Pat. No. 5,171,940 discloses a cold shrink sleeve which is expanded, and which consists of three layers bonded together whereby the temporary residual deformation of the innermost layer is less than the corresponding deformation of the other layers and the modulus of elasticity of such layer is greater than that of the outer layers. The expansion is stated to be in the order of 100% when measuring the inner diameter prior and after the expansion. The inner layer is formed of a material which exhibits a reduced residual deformation on discontinuance of the applied expansion stress and acts on the outer layers so that the whole splice can clamp around the smallest cables for which it is used. Upon removal of the support, the inner layer applies a predetermined radially inward pressure on the cables. The layers are coextruded and/or jointly cross-linked to form the splice.

U.S. Pat. No. 3,717,717, discloses an integral splice which includes three layers; an inner conductive layer, a middle heat-shrinkable insulation layer, and an outer semi-conductive layer. In order to achieve a geometric-capacitive field control, the extremities of the splice are conically shaped.

EPO Appl. 313,978 discloses a single piece radially expandable sleeve which is substantially uniform cylindrically. The middle and the outer layer are conventionally structured. The sleeve is formed of silicone elastomers, rubbers and several portions are filled to provide the desired conductivity.

U.S. Pat. No. 4,383,131 discloses an enclosure for a shielded cable termination or splice (joint) comprising a conductive outer layer, an insulating inner layer, and an optional stress gradient innermost layer. Preferred embodiments are heat-shrinkable; a long list of polymeric materials includes silicone elastomers. No fillers are disclosed; nor is thermal conductivity of the various polymeric matrices.

U.S. Pat. No. 4,390,745 discloses an enclosure for electrical apparatus comprising a first hollow sleeve of insulating material around which is positioned a second sleeve comprising an inner layer of insulating material and an outer layer of conductive material, e.g., a cable shield. This construction is disclosed to place the major discontinuities of the material enclosure wall between layers of insulating materials reducing the electrical stress. The first sleeve may have an inner laminate layer of stress grading material. A lengthy list of possible elastomers includes silicone polymers; however, heat recoverable articles are preferred.

EP 0404 090 A2 discloses an elastomeric covering for connections, including splices, terminations and end-seals, in electrical cables utilizing elastomeric pre-stretched tubes maintained in a radially expanded state by an inner removable core. A conformable material is interposed between the prestretched tube and the core whereby, when the core is removed, the tube conforms to the underlying surface. The conformable material may be insulative, or conductive, with or without dielectric fillers.

However, while silicone materials are sometimes recited as part of extensive lists, they typically do not possess the thermal conductivity to be used for splices in medium and high voltage cable splices and terminations.

A variety of thermally conductive organosiloxanes are also known in the art for uses as coatings, encapsulants and potting compounds for electronic devices; coatings for fuser rolls in copying machines, and the like.

U.S. Pat. No. 4,444,944 discloses a thermally conductive silicone rubber composition prepared by mixing 100 parts of an aliphatically unsaturated polyorganosiloxane, a polyorganohydrogensiloxane, and from 100 to 500 parts alumina powder having an average particle size of 2 μm to 10 μm and an oil absorption greater than 15 mL/g, and a platinum catalyst. The cured elastomers are disclosed to have tensile strengths of 2.7–4.8 MPa, and elongations of 80–100%. The thermal conductivities range from 1.8 to 2.5 cal/cm-sec° C.$\times 10^3$ (0.75–1.05 W/mK).

U.S. Pat. No. 4,544,696 discloses silicone elastomers which comprise an organosiloxane having Si-bonded aliphatically unsaturated groups, a catalyst, and from about 30 to about 95 percent of filler; at least 10% of the filler is silicon nitride particles. Other fillers such as metal oxides, aerogels, mica, glass beads and the like are also disclosed.

U.S. Pat. No. 5,011,870 discloses the combination of thermally conductive fillers with an average particle size of from about 10 to about 100 microns with submicron aluminum nitride for improved thermal conductivity of organosiloxane compositions.

U.S. Pat. No. 5,352,731 discloses a silicone rubber composition having thermal conductivity higher than $5 \times 10^{-3}$ cal/cm-sec° C. (2.09 w/mK). The composition comprises two different types of organopolysiloxanes having different polymerization degrees, aluminum oxide powder and a curative for the composition.

However, none of these silicone composition patents disclose electrical cable applications, or use of such materials in splices. The quantities of fillers required for these compositions produce cured elastomers having extremely low tensile and tear strengths, elongations and permanent set values. Elastically recoverable splices require tear strengths of at least about 10 N/mm, and also good elongation values, e.g., at least about 400%, in order to expand radially as required to terminate or splice an electrical cable without fracture of one or more layers. Further, electrical splices must be able to survive 30 days of current cycles without reaching temperatures above 165° C.; therefore the splice and material made therefrom must meet a variety of severe standards; it must be electrically insulating, thermally conducting and physically strong but flexible.

The current inventor has now discovered that a splice having an uniform cylindrical body, two opposing geometric cones capped by extended end seals where all layers are formed from a silicone, with the insulation being formed from a thermally conductive silicone elastomer, exhibits excellent electrical properties and physical properties over the silicone splices previously available. Surprisingly, the splice maintains a lower temperature during extreme emergency overload conditions than the conductor beyond the splice.

SUMMARY OF THE INVENTION

The invention provides an elastically recoverable elastomeric splice cover suitable for use covering a joint connector in a cable conductor, said splice cover comprising a central body having two distal opposing geometric cones capped by extended endseals, said body comprising three contiguous layers, a) a semiconductive outer shield layer, b) an inner toroidal electrode disposed along a central axis having a length less than that of said body, c) and interposed therebetween, an intermediate insulative layer having a length equal to that of said body and said geometric cones, and said outer shield layer and said electrode having been formed from a thermally conductive silicone elastomer, all of said layers having been formed from a silicone elastomer having a tear strength of at least about 15 N/mm, and an elongation of at least about 400%, said insulative layer further including from about 10% to about 35% of an electrically insulative filler, said layer having a minimum thermal conductivity of at least about 0.18 W/mK, wherein after 30 alternating load current cycles said connector has maintained a temperature of about 10° C. cooler than said cable conductor beyond said splice.

In a preferred embodiment, the invention provides an elastically recoverable elastomeric splice cover suitable for use covering a joint connector in a cable conductor, said splice cover comprising a central body having two distal opposing geometric cones capped by extended endseals, said body comprising three contiguous layers, a) a semiconductive outer shield layer, b) an inner toroidal electrode disposed along a central axis having a length less than that of said body, wherein said electrode has rounded ends, including at least one undercut extending inwardly from at least one of the ends and from the inner surface to a point intermediate the inner and the outer surface, c) and interposed therebetween, an intermediate insulative layer having a length equal to that of said body and said geometric cones, and said outer shield layer and said electrode having been formed from a thermally conductive silicone elastomer, all of said layers having been formed from a silicone elastomer having a tear strength of at least about 20 N/mm, and an elongation of at least about 400%, said insulative layer further including from about 10% to about 35% of an electrically insulative filler, said layer having a minimum thermal conductivity of at least about 0.18 W/mK, wherein after 30 alternating load current cycles said connector has maintained a temperature of about 10° C. cooler than said cable conductor beyond said splice.

The body of the splice cover may vary in shape for different embodiments; it may maintain an annular shape, or it may have an increased width for an area approximately adjacent to each end of the electrode, as seen in FIG. 3. Likewise, the geometric cones and extended endseals may vary in length.

As used herein, these terms have the following meanings.

1. The term "silicone elastomer" or "silicone rubber" means any of a variety of polyorganosiloxanes characterized by the presence of at least one type of repeating unit having the formula

$R_nSiO_{(4-n)/2}$ where R represents a monovalent hydrocarbon or substituted hydrocarbon radical and n is 1, 2, or 3.

2. The terms "elastically recoverable," "elastically shrinkable" and "cold shrinkable" are used interchangeably to mean that an article is shrinkable at temperatures of about −20° C. to about 50° C. without the addition of heat.

3. The term "extended endseal" means an endseal of at least about 1 cm. in length.

4. The term "thermally conductive" when used to refer to a material means that the material has good transfer of heat therethrough.

5. The term "tan delta" or "tan δ" refers to the electrical dissipation factor.

6. The terms "permittivity" and "relative permittivity" is the ratio of electric flux generated by a field in a medium to that generated by the material in a vacuum.

7. The term "dielectric constant" is synonymous to relative permittivity.

All parts, percents, and ratios herein are by weight unless otherwise specifically stated.

DESCRIPTION OF THE DRAWINGS

In FIG. 2, the splice cover 10, of FIG. 1 is shrunk onto a cable splice or connection such that the electrode 13 extends along the connector element 21, and engages the insulation 22. The exposed conductors of the cable ends are interconnected by means of a sleeve-like connector element 21. The connector element 21 is crimped onto the conductors. To this purpose it is necessary to remove the cable's insulation 22. The extended endseals 16 are in engagement with the cable insulation shield layer 23. It can be seen that, in this embodiment, the sleeve 10 when shrunk has a constant outer diameter and also approximately a constant inner diameter with some small deformations occurring at the transitions between layers.

FIG. 3 is another embodiment of the splice cover, again shown shrunk onto a cable splice or connection. In this embodiment, the splice body 11 does not have a constant outer diameter, but rather has two annular ridges 17 which approximately at the ends of the electrode 13, and terminate into the geometric cones 15.

DETAILED DESCRIPTION OF THE INVENTION

Figure 1:
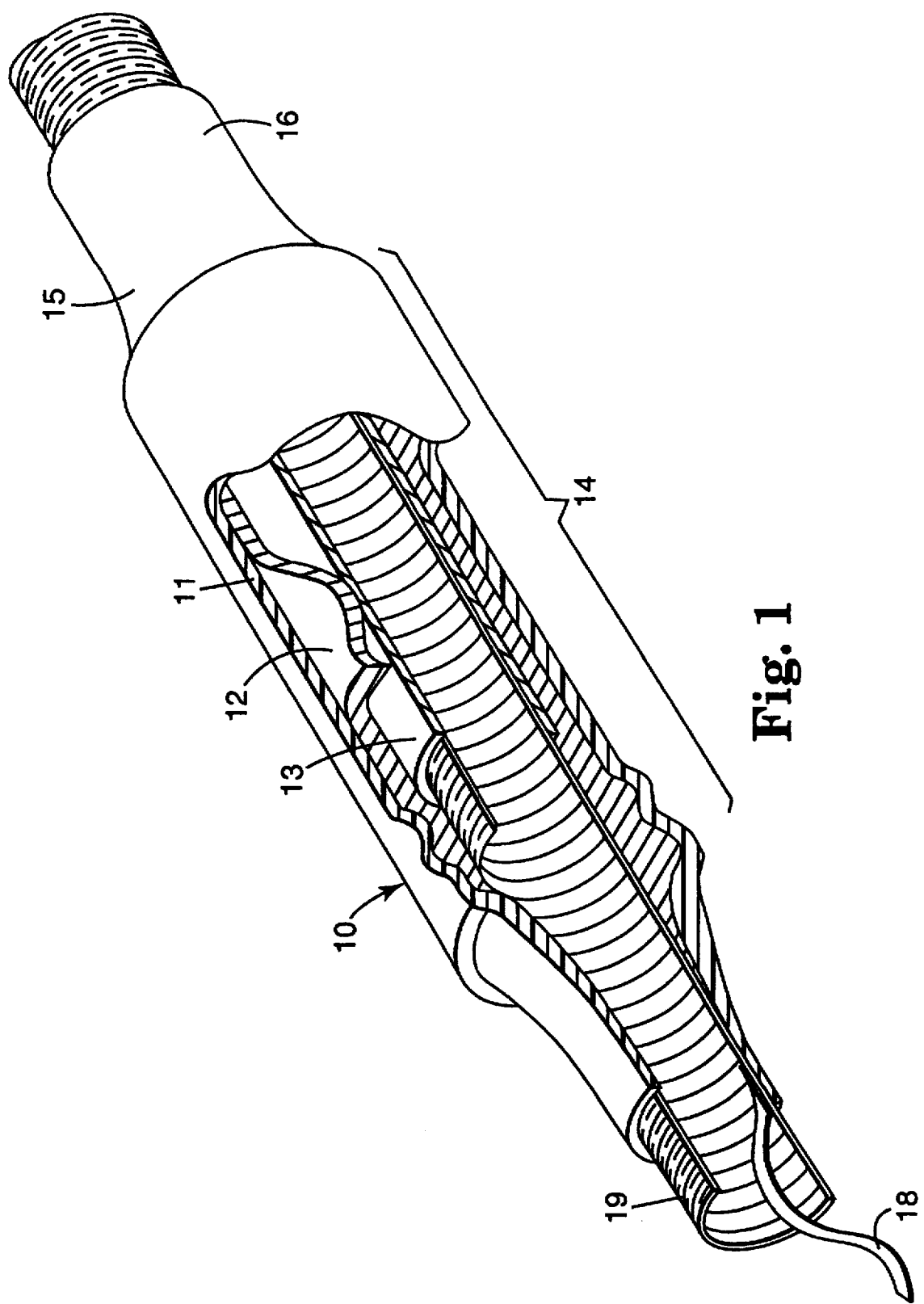
FIG. 1 is a perspective view of a splice cover of the invention partially cut away to show parts in section. As this shows, the splice cover 10, is a unitary article having three layers; a semi-conductive outer shield layer 11, an intermediate insulative layer 12, and an inner splice electrode, 13. The article has a central body, 14, two distal opposing geometric cones, 15, capped by extended endseals, 16. The splice cover is in a radially stretched state retained by a supporting core, 19, typically formed from polyethylene or polypropylene. This embodiment of the core has a manual handle 18, which can be gripped and pulled to remove the core.

Splice covers of the invention are unitary multilayer articles which are useful for protecting electrical junctions in medium voltage and high voltage electrical cables. The cover comprises three layers; an inner electrode, an intermediate insulative layer, and an outer semiconductive shield layer.

All layers are made of silicone elastomers which have sufficient elasticity to be radially expanded and relaxed to be placed onto a cable connection or termination.

Conductive silicone elastomers useful in splice covers of the invention include those conductive silicones having minimum tear strengths of at least about 20 N/mm, preferably at least about 30 N/mm, and elongations of at least about 400%, preferably at least about 500%.

Silicone normally has a rather poor thermal conductivity unless fillers are heavily used. Various ceramic materials have been used as fillers to render such silicones thermally conductive; however, typically, such high levels of the fillers have been required that the physical properties of the silicone have been comprised.

The thermally conductive silicone may be a liquid silicone or a gum silicone; gum silicones are preferred for easy compounding and processability.

Preferred silicone elastomers for use in the insulative layer include, but are not limited to, liquid silicones available as Baysilone® LSR series numbered 2030-2040, available from Bayer Corp., Elastosil® LR3013/40 to 3003/50, available from Wacker Silicones Corp., Silastic® 9280-30 to -40 series from Dow Corning, "KE 1950-30 to 1950-40", available from Shincor Silicones Inc., and "LIM 6030-D1, and 6040-D1", available from General Electric Corp.; as well as gum silicones available as Silastic® M2809 from Dow Corning, Elastosil® 4000/40 through 4000/70 from Wacker Silicones Corporation, Tufel® I SE846, and Tufel® II 94405, available from General Electric, "SVX-14007B", available from Shincor Silicones Inc. and "HVVPAC3537", available from Bayer Corp.

For use as the electrode layer, electrically conductive silicones such as Elastosil® R573/50, available from Wacker Silicones and "KE-3611U", available from Shincor Silicones.

The silicone elastomers typically are provided as two components, which must be stored separately until ready for processing. The two components are then blended together and at a specified ratio, typically about 1:2 to 2:1, preferably about 1:1, and molded into the desired shape.

Preferred silicones are platinum catalyzed silicones. The platinum catalyst may be the individual platinum group metal and its compounds, e.g., extremely fine platinum powder on a carbon powder carrier, choroplatinic acid, platinum chelates, chloroplatinic acid-olefin products, and similar metal compounds of palladium rhodium, iridium, ruthenium and osmium. Useful amounts of catalyst are from about 0.01 part to about 20 parts per 100 parts of organopolysiloxane.

Because the silicone elastomer is conductive, the electrode component of the splice does not require the addition of further conductive fillers.

The insulative layer of the splice necessarily contains a filler which is electrically insulating yet thermally conductive. The insulative layer contains from about 10% to about 35% of such electrically insulative filler, preferably from about 15% to about 30%. Useful fillers are nonreinforcing fillers such as zinc oxide, iron oxide, aluminum oxide and hydrates thereof, commonly available under the name alumina and alumina trihydrate, e.g., Micral® 9401 from J.M. Huber Corp., the C-70 series, such as C-71, C-72, and the like, available from Alcan Chemical, natural amorphous silica, such as that sold as "S Micron Silica", aluminum silicates, and the like. Such fillers may have surface treatments such as silanes, e.g., phenyltrimethoxysilane, vinyltrimethoxysilane, and the like.

Silicone polymers useful in splices of the invention may comprise further additives such as pigments or dyes for coloration of the splice or a single layer thereof; such pigments include carbon black, pigment Red 101, etc.; reinforcing silica fillers such as gels and aerosol, dispersants, flame retardants, and the like, so long as the amount of type of additive does not exert an adverse effect on the physical or electrical properties of the composition.

Splices of the invention have three contiguous layers; an inner electrode, an intermediate insulative layer, and an outer semiconductive shield layer.

The semi-conductive shield layer has a volume resistivity from about 30 to about 270 ohm cm, preferably about 150 ohm cm; the shield layer is from about 1.25 to about 5.2 mm thickness for the elongate body portion of the splice, and forms the cones and elongate endseals at a thickness of from about 2.5 mm to about 13 mm.

The inner or central electrode layer has a tubular or toroidal shape with rounded or elliptical ends. The electrode has an average length of from about 50% to about 90% of said body, disposed longitudinally in the center of the body. The volume resistivity of the electrode is from about 30 ohm cm to about 270 ohm cm, preferably from about 50 ohm cm to about 100 ohm cm.

In a preferred embodiment, the electrode is an inner toroidal electrode having an inner surface adjacent the cable, an outer surface and two ends, the ends being rounded and including at least one undercut extending inwardly from at least one of the ends and from the inner surface to a point intermediate the inner and the outer surface.

The undercut may include an angled surface intersecting the rounded end and extending away from the intersection to the inner surface of the electrode. The angled surface is preferably inclined at an angle of 45° with respect to the inner surface of the electrode.

In another embodiment, the angled surface may extend in a first surface from the intersection with the rounded surface at a shallower angle, preferably 15°, and a second surface intersecting the first surface and inclined at a preferred angle of 45°.

The insulative layer is interposed between the electrode and the semiconductive shield layer and also extends into the geometric cone.

Splices of the invention are provided in a radially expanded or stretched condition on a removable rigid core. Although any conventional type of core may be used, preferred articles of the invention are provided on a rigid cylindrical core in the form of a helical coil, or a series of coils, e.g., those disclosed in from U.S. Pat. Nos. 3,515,798, 4,871,599 and 4,934,227, and 4,503,105, or the German patent specification 37 15915. Adjacent convolutions of the support core are interconnected in circumferential areas so that the coil may withstand the inherent radial forces of the splice. A portion of the coil, i.e., the removal strip, is led back through the coil and can be manually gripped at one end of the splice. The convolutions will then separate singly. By withdrawing the coil from the splice one helical convolution at a time, the splice is allowed to radially shrink onto a connection or terminal, from one end to the other. Manual pulling of the removal strip provides fully adequate force to unwind and remove the core, leaving the splice tightly affixed to the cable.

The core may be made from a variety of materials, e.g., polyvinyl chloride, polyethylene terephthalate, cellulose acetate butyrate, and the like; the material need merely be a material which is sufficiently rigid to support the splice, and allow manual removal of the entire core, while being flexible enough to permit the required unwinding.

Splices of the invention have a long lifetime; e.g., at least about 20 years. Long term reliability is a combination of the article design and the long term stability of these materials.

The geometry of the cable enables effective stress control with low danger of breakdowns and thermal runaway. It is critical to maintain an integral interface between the cable insulation and splice insulation. The splice covers of the invention have the ability to be stored at 200%–250% expansion and then perform at 20% expansion for many years. Because heating of the splice is not required for installation, the connection can be operated immediately thereafter. The electric properties will be met in the normally prevailing temperatures ranges of about −20° C. to about 130° C., without failure of the sealing against humidity and precipitation.

In order to form the splice, the silicone composition to be used for each layer is mixed and cured, or vulcanized, at high temperatures. The silicone compositions may use the same or different silicones or mixtures thereof. However, the insulative layer must also have the electrically insulative filler mixed therein. The electrode and the semi-conductive shield layer are formed by molding, using any conventional molding technique, but preferably injection molding.

After injection molding of the outer semi-conductive shield layer and the electrode, the splice is assembled. While various conventional techniques are acceptable, the splice is preferably assembled using a mandrel.

This assembly procedure involves providing a mandrel which has an area of increased diameter somewhat larger than the diameter of the electrode. The electrode is forced onto the mandrel. The outer shield layer is lid onto the mandrel over the electrode. A circular aperture is formed in the outer semiconductive shield layer approximately central to the length of the splice body. Both ends of the outer shield layer are then sealed, and an insulating compound injection nozzle is then force fit into the aperture, and the entire assembly is placed into a mold which has the same shape as the exterior shield layer. The mold is clamped shut and insulating compound is injected through the nozzle between the outer shield layer and the electrode under high pressure. When the space is filled, the pressure of the insulating composition has forced intimate contact with both the electrode, and the semiconductive shield layer, as well as forcing the electrode to conform intimately to the mandrel, and expanding the outer sleeve against the interior of the mold. Thus, any voids are eliminated. Finally, the insulating compound is cured by heating the mold to a temperature of from about 100° C. to about 200° C., preferably at least about 175° C. for a period of from about 2 minutes to about 15 minutes.

The following examples are meant to be illustrative and are not intended to limit the scope of the invention which is expressed solely by the claims.

Test Methods

The following test methods are used in the examples.

| Physical Properties | |
|---|---|
| Hardness | ASTM D 2240-86 |
| Elongation | ASTM D 412-87 |
| Tensile Strength | ASTM D 412-87 |
| 100% Modulus | " |
| 200% Modulus | " |
| 300% Modulus | " |
| Tear Strength Die B | ASTM D 624-86 |
| Tear Elongation Die B | " |
| Tear Strength Die C | " |
| Tear Elongation Die C | " |
| Specific Gravity | ASTM D 792-86 |
| Electrical Properties | |
| Alternating Cycle Test | IEEE 404 |
| A/C Withstand | " |
| Dielectric Strength | ASTM-D-149-93 |

EXAMPLES

Examples 1–7

Liquid silicone formulations were made using Baysilone® LSR 2030 (parts A and B), available from Bayer Corp., Baysilone® U10, a vinyl-terminated polydimethylsiloxane containing SiH groups, available from Bayer Corp., a crosslinking agent Baysilone 430, also from Bayer Corp., and Baysilone U catalyst. The formulation was mixed, and allowed to cure for 10 minutes at 175° C. In Example 6, the indicated number of parts of C71FG alumina, available from Alcan Company was added directly to the silicone; in Example 7, the alumina was added in a slurry. The formulations are shown in detail in Table 1.

These formulations were then molded into 10 cm×0.2 cm slabs for 10 minutes at 175° C. and post cured for 4 hours at 200° C. The samples were then tested for various physical characteristics. The formulations containing the aluminum have greater thermal conductivity; however Example 7 shows that the effect of adding the alumina in a slurry is a reduction of modulus at all elongations measured.

TABLE I

| Ingred. | Example No. | | | | | | |
|---|---|---|---|---|---|---|---|
| (wt %) | 1 | 2 | 3 | 4 | 5 | 6 | 7 |
| LSR2030A | 50 | 45 | 48.4 | 50 | 43.7 | 38.5 | 34.6 |
| LSR2030B | 50 | 45 | 48.4 | 50 | 43.7 | 38.5 | 34.6 |
| C71FG Alumina | — | — | — | — | — | 23.0 | 23.1 |
| U10 Oil | — | 10 | — | — | 9.7 | — | 7.7 |
| Baysilone Crosslinking Agt. 430 | — | — | 3.2 | — | 2.9 | — | — |
| Pt Catalyst (ppm) | — | — | — | 2 | 2 | — | — |

TABLE II

| | 1 | 2 | 3 | 4 | 5 | 6 | 7 |
|---|---|---|---|---|---|---|---|
| Thermal Cond. (W/m K) | 0.142 | * | * | * | * | 0.191 | 0.180 |
| Shore A Hardness | 31 | 28 | 36 | 31 | 33 | 39 | 35 |
| Permanent Set (%) | 1.4 | 2.5 | 1.0 | 1.2 | <0.5 | 2.7 | 2.5 |
| Elong. at Break (%) | 749 | 757 | 708 | 843 | 646 | 683 | 653 |
| Tensile at Break (MPa) | 11.8 | 9.8 | 10.3 | 11.0 | 9.3 | 9.0 | 7.7 |
| Modulus at 100% (MPa) | .7 | .5 | 1.0 | .6 | .9 | 1.1 | .9 |
| Modulus at 200% (MPa) | 1.4 | 1.2 | 2.2 | 1.2 | 2.1 | 2.2 | 2.2 |
| Modulus at 300% (MPa) | 2.3 | 2.1 | 3.6 | 2.1 | 3.4 | 3.9 | 3.6 |

*Thermal conductivity is not affected by amount of catalyst, U10, and crosslinker.

Example 8 and Comparative Example 9

Example 8 was made from 100 parts gum silicone; i.e., Silastic® M2809, available from Dow Corning, 30 parts C71FG alumina, available from Alcan Company. The silicone, catalyst, and C71FG alumina were compounded and mixed using 2 roll mills, or dough mixers.

Example 6 is as described above, and Comparative Example 9 is the insulation used in a commercial splice cover "QS2000LSR", available from 3M Company. All materials were molded into slabs.

The three slabs were tested for physical, electrical, and thermal properties, and the values are shown in Table 3. This table shows that compositions of the invention have improved tear strength (for Example 8) over that of the commercial splice cover. Therefore, materials of the invention exhibit an improved thermal conductivity without an attendant decrease in physical properties.

Further, when Example 8 was tested using IEEE 404, 15 kV class requirements, the connector temperature under the splice cover held a temperature of about 10° C. less than the conductor temperature (130° C.). A second sample identical to Example 8 was tested under the same conditions, and the connector temperature was 17° C. less than the conductor temperature.

TABLE III

|  | Example 8 | Example 6 | Example C9 |
|---|---|---|---|
| Physical Property | | | |
| Hardness Shore A | 50 | 39 | 31 |
| Elongation (%) | 690 | 683 | 749 |
| Tensile Strength (MPa) | 8.4 | 9.0 | 11.8 |
| 100% Modulus (MPa) | 2.4 | 1.1 | .7 |
| 200% Modulus (MPa) | 3.5 | 2.4 | 1.4 |
| 300% Modulus (MPa) | 4.2 | 3.8 | 2.3 |
| Tear Strength (N/m) | 40,300 | — | 20,000 |
| Tear Elongation (%) | 330 | — | — |
| Permanent Set (22 hrs/100° C./100%) | 5.2 | 2.7 | 1.4 |
| Electrical Properties | | | |
| Dielectric Constant (500 V) | 3.3 | — | 3.3 |
| tan δ (500 V) | .0048 | — | .0025 |
| Volume Resistivity (500 V) | $6 \times 10^{14}$ | — | $3 \times 10^{15}$ |
| Dielect. Stren. (kV/mm) | 21.2 | — | 22.0 |
| Thermal Properties | .242 | .191 | .167 |
| Thermal Conductivity (W/m K) | | | | commercial Product

What is claimed is:

1. An elastically recoverable elastomeric splice cover suitable for use covering a joint connector in a cable conductor, said splice cover comprising a central body having two distal opposing geometric cones capped by extended endseals, said body consisting essentially of three contiguous layers,
   a) a semiconductive outer shield layer,
   b) an inner toroidal electrode disposed along a central axis having a length less than that of said body,
   c) and interposed therebetween, an intermediate insulative layer having a length equal to that of said body and said geometric cones, and
   said outer shield layer and said electrode having been formed from a thermally conductive silicone elastomer, all of said layers having been formed from a silicone elastomer having a tear strength of at least about 15 N/mm, and an elongation of at least about 400%, said insulative layer further including from about 10% to about 35% of an electrically insulative thermally conductive filler, said insulative layer having a minimum thermal conductivity of at least about 0.18 W/mK,
   wherein after 30 alternating load current cycles said connector has maintained a temperature of about 10° C. cooler than said cable conductor beyond said splice.

2. An elastically recoverable splice cover according to claim 1 wherein said silicone elastomer is selected from the group consisting of liquid silicone elastomers and gum silicone elastomers, said elastomer also having a permanent set of no more than about 5%.

3. An elastically recoverable splice cover according to claim 1 wherein said silicone elastomer has a tear strength of at least 20 N/mm.

4. An elastically recoverable splice cover according to claim 1 wherein at least one of said layers is formed from a blend of silicone elastomers.

5. An elastically recoverable splice cover according to claim 1 wherein said insulative layer includes from about 10% to about 30% of said electrically insulative, thermally conductive filler selected from the group consisting of zinc oxide, iron oxide, aluminum oxide and hydrates thereof.

6. An elastically recoverable splice cover according to claim 1 wherein said thermal conductivity is at least about 0.24 W/mK.

7. An elastically recoverable splice cover being suitable for use covering a joint connector in a cable conductor, said splice cover comprising a central body having two distal opposing geometric cones capped by extended endseals, said body comprising three contiguous layers,
   a) a semiconductive outer shield layer,
   b) an inner toroidal electrode disposed along a central axis having a length less than that of said body,
   c) and interposed therebetween, an intermediate insulative layer having a length equal to that of said body and said geometric cones, and
   said outer shield layer and said electrode having been formed from a thermally conductive silicone elastomer, all of said layers having been formed from a silicone elastomer having a tear strength of at least about 15 N/mm, and an elongation of at least about 400%, said insulative layer further including from about 10% to about 35% of an electrically insulative filler, said insulative layer having a minimum thermal conductivity of at least about 0.18 W/mK,
   wherein after 30 alternating load current cycles said connector has maintained a temperature of about 10° C. cooler than said cable conductor beyond said splice, wherein all of said layers are formed by injection molding.

8. An elastically recoverable splice cover according to claim 1 wherein said endseals have a length of at least about 1 cm.

9. An elastically recoverable splice cover according to claim 1 wherein said electrode has a volume resistivity of from about 30 to about 250 ohm-cm.

10. An elastically recoverable elastomeric splice cover suitable for use covering a joint connector in a cable conductor, said splice cover comprising a central body having two distal opposing geometric cones capped by extended endseals, said body comprising three contiguous layers,
   a) a semiconductive outer shield layer,
   b) an inner toroidal electrode disposed along a central axis having a length less than that of said body, wherein said electrode has rounded ends, including at least one undercut extending inwardly from at least one of the ends and from an inner surface to a point intermediate to said inner surface and an outer surface,
   c) and interposed therebetween, an intermediate insulative layer having a length equal to that of said body and said geometric cones, and
   said outer shield layer and said electrode having been formed from a thermally conductive silicone elastomer, all of said layers having been formed from a silicone elastomer having a tear strength of at least about 20 N/mm, and an elongation of at least about 400%, said insulative layer further including from about 10% to about 35% of an electrically insulative thermally conductive filler, said insulative layer having a minimum thermal conductivity of at least about 0.18 W/mK, wherein after 30 alternating load current cycles said connector has maintained a temperature of about 10° C. cooler than said cable conductor beyond said splice.

11. An elastically recoverable splice cover according to claim 10 wherein said thermal conductivity is at least about 0.24 W/mK.

12. An elastically shrinkable splice cover wherein said cover is formed by injection molding, suitable for use covering a joint connector in a cable conductor, said splice cover comprising a central body having two distal opposing geometric cones capped by extended endseals, said body comprising three contiguous layers, a) a semiconductive outer shield layer, b) an inner toroidal electrode disposed along a central axis having a length less than that of said body, wherein said electrode has rounded ends, including at least one undercut extending inwardly from at least one of the ends and from an inner surface to a point intermediate to said inner surface and an outer surface, c) and interposed therebetween, an intermediate insulative layer having a length equal to that of said body and said geometric cones, and said outer shield layer and said electrode having been formed from a thermally conductive silicone elastomer, all of said layers having been formed from a silicone elastomer having a tear strength of at least about 20 N/mm, and an elongation of at least about 400%, said insulative layer further including from about 10% to about 35% of an electrically insulative filler, said insulative layer having a minimum thermal conductivity of at least about 0.18 W/mK, wherein after 30 alternating load current cycles said connector has maintained a temperature of about 10° C. cooler than said cable conductor beyond said splice.

13. An elastically recoverable splice cover according to claim 10 wherein said insulative layer includes from about 10% to about 30% of said electrically insulative, thermally conductive filler selected from the group consisting of zinc oxide, iron oxide, aluminum oxide and hydrates thereof.

14. An elastically recoverable splice cover according to claim 13 wherein said thermally conductive filler is selected from the group consisting of aluminum oxide and hydrates thereof.

15. An elastically recoverable splice cover according to claim 1 wherein said splice body has an annular shape and a constant outer diameter.

16. An elastically recoverable splice cover according to claim 1 wherein said splice body has two annular ridges.

* * * * *